United States Patent
Chang et al.

(10) Patent No.: US 8,217,532 B2
(45) Date of Patent: Jul. 10, 2012

(54) REAL TIME CLOCK DRIVING CIRCUIT

(75) Inventors: Pai-Hao Chang, Taipei Hsien (TW); Yu-Lin Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 392 days.

(21) Appl. No.: 12/503,856

(22) Filed: Jul. 16, 2009

(65) Prior Publication Data
US 2010/0320841 A1   Dec. 23, 2010

(30) Foreign Application Priority Data
Jun. 17, 2009   (CN) .......................... 2009 1 0303335

(51) Int. Cl.
*H02J 7/00* (2006.01)
*H02J 1/00* (2006.01)
(52) U.S. Cl. ................. 307/66; 307/45; 307/46; 307/48
(58) Field of Classification Search ................ 307/45, 307/46, 48, 66
See application file for complete search history.

(56) References Cited

U.S. PATENT DOCUMENTS 5,136,175 A * 8/1992 Losel .............................. 307/66
5,610,450 A * 3/1997 Saeki et al. ..................... 307/46

FOREIGN PATENT DOCUMENTS
JP   2009-55389 A   3/2009

* cited by examiner

*Primary Examiner* — Hal Kaplan
(74) *Attorney, Agent, or Firm* — Altis Law Group, Inc.

(57) ABSTRACT

A real time clock driving circuit for driving a real time clock includes a power source, a flash driving circuit, a switch circuit, and an electronic source. The flash driving circuit includes a booster, a charging capacitor, and a number of first resistor dividers. The anode of the charging capacitor and the first resistor dividers are coupled to an output of the booster. A node is defined between two of the first resistor dividers. The switch circuit includes a MOS transistor and a second resistor divider. The source of the MOS transistor is coupled to the node. The gate is coupled to the node via the second resistor divider. The drain is coupled to the power input of the real time clock. The power source is coupled to the input of the booster, the gate, and the power input of the real time clock.

14 Claims, 1 Drawing Sheet

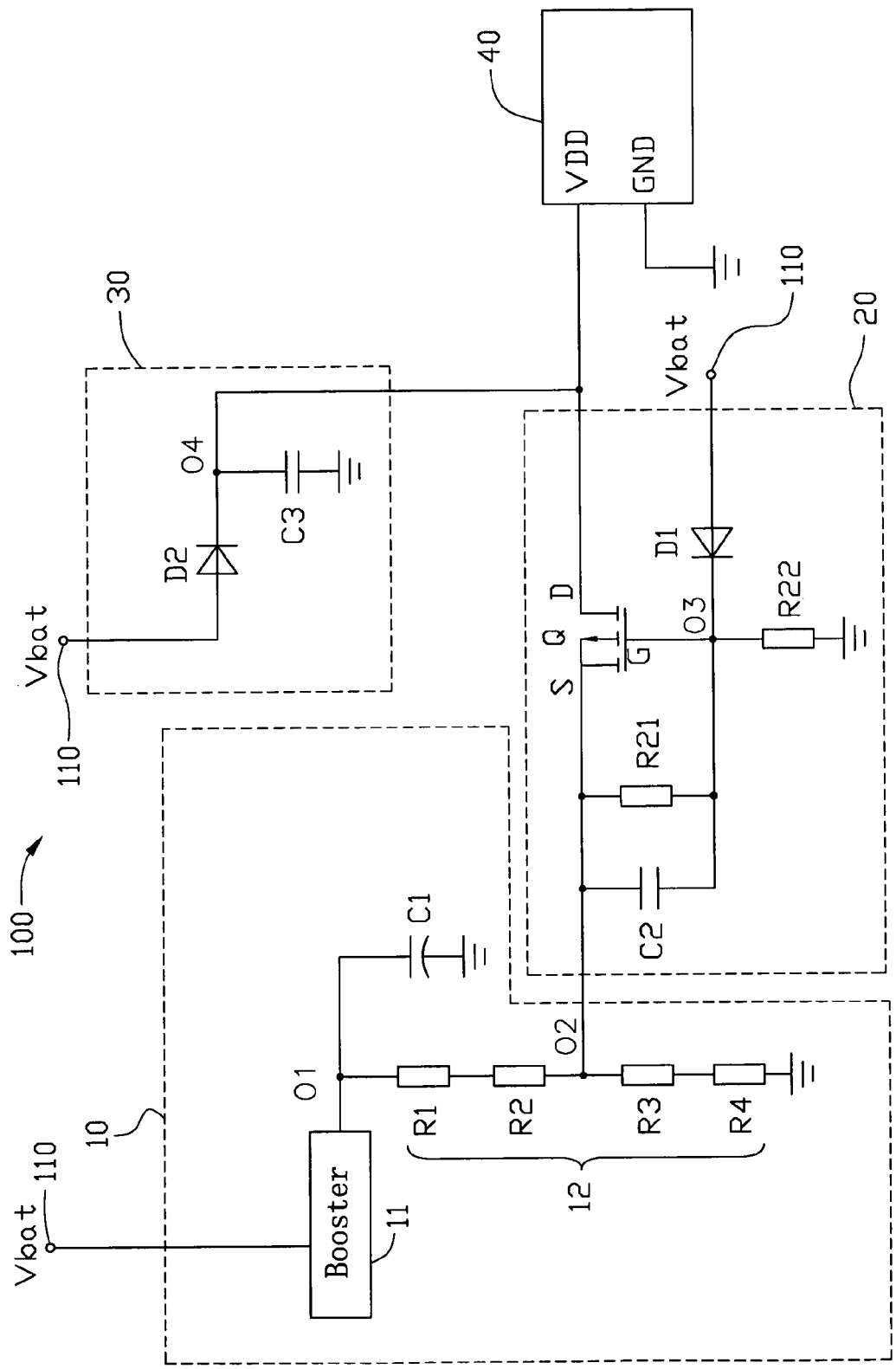

REAL TIME CLOCK DRIVING CIRCUIT

BACKGROUND

1. Technical Field

The present disclosure relates to a real time clock (RTC) driving circuit.

2. Description of the Related Art

In electronic systems, an RTC is a computer clock (most often in the form of an integrated circuit) that is widely used to keep track of the current time, especially when the electronic systems are powered off. Current RTCs of digital cameras typically includes a gold capacitor for power supply, which is costly.

Therefore, what is desired is an RTC driving circuit that can overcome the above described limitations.

BRIEF DESCRIPTION OF THE DRAWINGS

Many aspects of the present RTC driving circuit should be better understood with reference to the accompanying drawings. The components in the drawings are not necessarily drawn to scale, the emphasis instead being placed upon clearly illustrating the principles of the RTC driving circuit. Moreover, in the drawings, like reference numerals designate corresponding parts throughout the several views.

The FIGURE is a schematic view of an RTC driving circuit in accordance with an exemplary embodiment.

DETAILED DESCRIPTION

Embodiments of the present RTC driving circuit will be now described in detail with reference to the drawings.

Referring to the FIGURE, an RTC driving circuit 100 used for providing electrical power for an RTC 40 of an electronic device, such as a digital camera (not shown), in accordance with an exemplary embodiment is illustrated. The RTC driving circuit 100 includes a power source 110, a flash driving circuit 10, a switch circuit 20, and a main power supply circuit 30.

In this embodiment, the power source 110 is a rechargeable battery, e.g., one in the digital camera, and the power source 110 outputs a 3-Volt voltage.

The flash driving circuit 10 is configured for storing electrical power and driving a flash lamp (not shown) of the digital camera to flash. In this embodiment, the RTC driving circuit 100 shares the flash driving circuit 10 with the flash lamp. That is, the flash driving circuit 10 is also capable of driving the RTC 40, especially in case of failure of the main power supply circuit 30 (see below). As such, the RTC driving circuit 100 makes maximum usage of the flash driving circuit 10.

In particular, the flash driving circuit 10 includes a booster 11, a number of first resistor dividers 12, and a charging capacitor C1. The booster 11 includes an input coupled to the power source 110, and an output coupled to the anode of the charging capacitor C1. The booster 11 is operable for outputting a 300-Volt voltage to the anode of the charging capacitor C1 to charge the charging capacitor C1. The cathode of the charging capacitor C1 is grounded. The charging capacitor C1 is operable for storing electrical energy for the flash lamp of the digital camera. A first node O1 is defined between the output of the booster 11 and the anode of the charging capacitor C1. The voltage of the first node O1 is $V_{O1}$. In this embodiment, the first resistor dividers 12 are coupled in series between the output of the booster 11 and the ground. The first resistor dividers 12 include a first resistor R1, a second resistor R2, a third resistor R3, and a fourth resistor R4. The first resistor R1, the second resistor R2, the third resistor R3, and the fourth resistor R4 are connected in series. One terminal of the first resistor R1 is coupled to the first node O1, and one terminal of the fourth resistor R4 is grounded. In this embodiment, a second node O2 is defined between the second resistor R2 and the third resistor R3. The voltage of the second node O2 is $V_{O2}$, where $V_{O2}=(R3+R4)V_{O1}/(R1+R2+R3+R4)$. In this embodiment, $(R3+R4)/(R1+R2+R3+R4)$ is about 0.01.

It should be mentioned that the number of first resistor dividers 12 are not limited to four, but can be more or less depending on requirements and the resistance values thereof.

The switch circuit 20 includes a metal-oxide semiconductor (MOS) transistor Q, a second resistor divider R21, an output resistor R22, a first diode D1, and a bypass capacitor C2. In this embodiment, the MOS transistor Q is a P-MOS transistor. The source S of the MOS transistor Q is coupled to the second node O2. The drain D of the MOS transistor Q is coupled to a power input VDD of the RTC 40. The power source 110 is coupled to the gate G of the MOS transistor Q via the first diode D1, the anode of the first diode D1 is coupled to the power source 110. A third node O3 is defined between the gate G of the MOS transistor Q and the cathode of the first diode D1. One end of the output resistor R22 is coupled to the third node O3, and the other end is grounded. The anode of the bypass capacitor C2 is coupled to the second node O2, and the cathode is coupled to the third node O3. The input of the second resistor divider R21 is coupled to the second node O2, and the output is coupled to the third node O3.

The main power supply circuit 30 includes a second diode D2, a filtering capacitor C3. The power source 110 is coupled to the power input VDD of the RTC 40 via the second diode D2. A fourth node O4 is defined between the cathode of the second diode D2 and the power input VDD of the RTC 40. The anode of the filtering capacitor C3 is coupled to the fourth node O4, and the cathode is grounded.

In use, when the power source 110 is available, e.g., before the rechargeable battery is drained off, the voltage of power source 110 is boosted to 300-Volt by the booster 11 to charge to the charging capacitor C1. At the same time, the power source 110 provides power source to the gate G of the MOS transistor Q of the switch circuit 20. However, the voltage of the first node O1 $V_{O1}$ passes through the first resistor dividers 12 to the source S of the MOS transistor Q. Due to the voltage division of the first resistor dividers 12, the voltage of the source S of the MOS transistor Q is smaller than that of the power source 110. In other words, the voltage of the source S of the MOS transistor Q is smaller than that of the gate G of the MOS transistor Q. As a result, the MOS transistor Q is in a cut-off state. The operating voltage of the RTC IC 40 is provided by the main power supply circuit 30.

When the power source is not available, for example, after the rechargeable battery is drained off, the voltage of the power source is about 0-Volt. The charging capacitor C1 discharges. In this embodiment, the discharging voltage is about 300-Volt. As a result, the voltage of the first node O1 $V_{O1}$ is about 300-Volt. Due to the voltage division of the first resistor dividers 12, and the ratio $(R3+R4)/(R1+R2+R3+R4)$ is about 0.01. The second node O2 gains a voltage $V_{O2}$ about 3-Volt. That is, the voltage of the source of the MOS transistor Q is about 3-Volt. Meanwhile, the voltage $V_{O2}$ passes through the second resistor divider R21 to the gate G of the MOS transistor Q, the gate G of the MOS transistor Q gains a voltage about 0.3-Volt voltage. Because the voltage the gate G of the MOS transistor Q is smaller than that of the source S, the MOS transistor Q is in break-over state, so the operating voltage of the RTC IC 40 is provided by the charging capacitor C1.

As compared with conventional RTC of digital cameras, when the power source 110 is not available, the MOS transistor Q is in break-over state, so the operating voltage of the RTC 40 is provided by the charging capacitor C1. As a result, a gold capacitor for supplying electronic source to the RTC 40 can be omitted, and the production costs are reduced. In addition, the capacitance of the charging capacitor C1 is large, which can provide power supply for a long time.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A real time clock driving circuit for driving a real time clock, comprising:
 a power source coupled to a power input of the real time clock;
 a flash driving circuit comprising a booster, a charging capacitor, and a plurality of first resistor dividers, the booster comprising an input and an output, the input being coupled to the power source, the anode of the charging capacitor being coupled to the output of the booster, the cathode of the charging capacitor being grounded, the first resistor dividers being coupled in series between the output of the booster and the ground; and
 a switch circuit comprising a MOS transistor and a second resistor divider, the source of the MOS transistor coupled to a node between two of the first resistor dividers, the gate of the MOS transistor coupled to the node via the second resistor divider, and the drain of the MOS transistor coupled to the power input of the real time clock.

2. The real time clock driving circuit as claimed in claim 1, wherein when the power source is available, the voltage of the power source is boosted by the booster to charge the charging capacitor, and the charging capacitor stores electrical energy; when the power source is not available, the MOS transistor is in break-over state, and the operating voltage of the real time clock is provided by the charging capacitor.

3. The real time clock driving circuit as claimed in claim 1, wherein the first resistor dividers comprise a first resistor, a second resistor, a third resistor, and a fourth resistor, the first resistor, the second resistor, the third resistor, and the fourth resistor are connected in series, the node is defined between the second resistor and the third resistor, one end of the second resistor which is not connected to the first resistor is coupled to the node, and one end of the fourth resistor which is not connected to the third resistor is coupled to the ground.

4. The real time clock driving circuit as claimed in claim 3, wherein the switch circuit further comprises an output resistor and a first diode, one end of the output resistor is coupled to a gate of the MOS transistor, and the other end of the output resistor is grounded, an anode of the first diode is coupled to the power source, and a cathode of the first diode is coupled to the gate of the MOS transistor.

5. The real time clock driving circuit as claimed in claim 4, wherein the switch circuit further comprises a bypass capacitor, an anode of the bypass capacitor is coupled to the node between the second resistor and the third resistor, and a cathode of the bypass capacitor is coupled to another node between the gate of the MOS transistor and the output resistor.

6. The real time clock driving circuit as claimed in claim 1, wherein the MOS transistor is a P-MOS transistor.

7. The real time clock driving circuit as claimed in claim 1, wherein the power source is a rechargeable battery.

8. A real time clock driving circuit for driving a real time clock, comprising:
 a power source coupled to a power input of the real time clock;
 a flash driving circuit comprising a booster, a charging capacitor, and a plurality of first resistor dividers, the booster comprising an input and an output, the input being coupled to the power source, the anode of the charging capacitor being coupled to the output of the booster, the cathode of the charging capacitor being grounded, the first resistor dividers being coupled in series between the output of the booster and the ground, a node being defined between the first resistor dividers;
 a switch circuit comprising a MOS transistor and a second resistor divider, the source of the MOS transistor coupled to the node, the gate of the MOS transistor coupled to the node via the second resistor divider, and the drain of the MOS transistor coupled to the power input of the real time clock; and
 a main power supply circuit comprising a second diode, a filtering capacitor, the power source coupled to the power input of the real time clock via the second diode, a fourth node being defined between the cathode of the second diode and the power input of the real time clock, the anode of the filtering capacitor coupled to the fourth node, and the cathode is grounded.

9. The real time clock driving circuit as claimed in claim 8, wherein when the power source is available, the voltage of the power source is boosted by the booster to charge the charging capacitor, and the charging capacitor stores electrical energy; when the power source is not available, the MOS transistor is in break-over state, and the operating voltage of the real time clock is provided by the charging capacitor.

10. The real time clock driving circuit as claimed in claim 8, wherein the first dividers comprise a first resistor, a second resistor, a third resistor, and a fourth resistor, the first resistor, the second resistor, the third resistor, and the fourth resistor are connected in series, the node is defined between the second resistor and the third resistor, one end of the second resistor which is not connected to the first resistor is coupled to the node, and one end of the fourth resistor which is not connected to the third resistor is coupled to the ground.

11. The real time clock driving circuit as claimed in claim 10, wherein the switch circuit further comprises an output resistor and a first diode, one end of the output resistor is coupled to the gate of the MOS transistor, and the other end of the output resistor is grounded, an anode of the first diode is coupled to the power source, and a cathode of the first diode is coupled to the gate of the MOS transistor.

12. The real time clock driving circuit as claimed in claim 11, wherein the switch circuit further comprises a bypass capacitor, an anode of the bypass capacitor is coupled to the node between the second resistor and the third resistor, and a cathode of the bypass capacitor is coupled to another node between the gate of the MOS transistor and the output resistor.

13. The real time clock driving circuit as claimed in claim 8, wherein the MOS transistor is a P-MOS transistor.

14. The real time clock driving circuit as claimed in claim 8, wherein the power source is a rechargeable battery.

* * * * *